(12) United States Patent
Birk et al.

(10) Patent No.: US 9,460,279 B2
(45) Date of Patent: Oct. 4, 2016

(54) VARIABLE IMAGE PRESENTATION FOR AUTHENTICATING A USER

(71) Applicant: International Business Machines Corporation, Armonk, NY (US)

(72) Inventors: Peter Daniel Birk, Austin, TX (US); Cesar Eduardo Gonzalez Borjon, El Salto (MX); Nader M. Nassar, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/538,932

(22) Filed: Nov. 12, 2014

(65) Prior Publication Data

US 2016/0132673 A1 May 12, 2016

(51) Int. Cl.
   *G06F 21/36* (2013.01)
   *G06F 21/31* (2013.01)
   *G06F 21/62* (2013.01)
   *G06F 21/30* (2013.01)

(52) U.S. Cl.
   CPC .............. *G06F 21/36* (2013.01); *G06F 21/30* (2013.01); *G06F 21/31* (2013.01); *G06F 21/62* (2013.01)

(58) Field of Classification Search
   CPC ........ G06F 21/36; G06F 21/40; G06F 21/30; G06F 21/31; G06F 21/62
   See application file for complete search history.

(56) References Cited

U.S. PATENT DOCUMENTS 7,992,005 B2   8/2011  Torres et al.
8,347,103 B2   1/2013  Jones et al.
8,631,487 B2   1/2014  Griffin et al.
2005/0044372 A1*  2/2005  Aull .................. G06F 21/35
                                              713/176

(Continued)

FOREIGN PATENT DOCUMENTS

EP   2126773 A1   12/2009
GB   2495580 A    4/2013

OTHER PUBLICATIONS

Password-Based Access Control Scheme with Remote User Authentication Using Smart Cards, http//ieeexplore.ieee.org/xpl/freeabs_all.jsp?arnumber=4224145.

(Continued)

*Primary Examiner* — Morshed Mehedi
*Assistant Examiner* — Ayoub Alata
(74) *Attorney, Agent, or Firm* — Ronald A. Kaschak, Esq.; Matthew M. Hulihan, Esq.; Heslin Rothenberg Farley & Mesiti P.C.

(57) ABSTRACT

Facilities are provided herein for authenticating a user to use a processing device. A user predefines authenticators of one or more types and associates these with graphical images. Upon on attempt to activate the processing device, a graphical image, of the graphical images, is selected for presentation to the user. The selected graphical image is presented to the user, who then provides input to authenticate with the device. A determination is made as to whether the user is authenticated to use the device. The determination is made based on input received from the user and based further on the authenticator associated with the selected graphical image. Varying the selection of image(s), each associated with a predefined authenticator and authentication type, enables variability in the authenticator that is suitable for unlocking a device at a given time, providing greater security to the authentication process.

17 Claims, 9 Drawing Sheets

(56) References Cited

U.S. PATENT DOCUMENTS

| | | |
|---|---|---|
| 2008/0016369 A1 | 1/2008 | Kirovski et al. |
| 2008/0141363 A1 | 6/2008 | White |
| 2009/0038006 A1 | 2/2009 | Traenkenschuh et al. |
| 2010/0287382 A1 | 11/2010 | Gyorffy et al. |
| 2010/0322485 A1 | 12/2010 | Riddiford |
| 2011/0096997 A1 | 4/2011 | Marciszko et al. |
| 2011/0202982 A1* | 8/2011 | Alexander ............ G06F 21/36 726/7 |
| 2011/0283241 A1 | 11/2011 | Miller et al. |
| 2012/0023574 A1 | 1/2012 | Osborn et al. |
| 2013/0036461 A1* | 2/2013 | Lowry .................. G06F 21/36 726/19 |
| 2013/0036462 A1 | 2/2013 | Krishnamurthi |
| 2014/0187200 A1* | 7/2014 | Reitter ................. H04W 4/021 455/410 |

OTHER PUBLICATIONS

Suo et al., "Graphical Passwords: A Survey", Computer Security Applications Conference, 21st Annual, Dec. 5-9, 2005.

Jansen, "Authenticating Mobile Device Users Through Image Selection", The National Institute of Standards and Technology.

\* cited by examiner

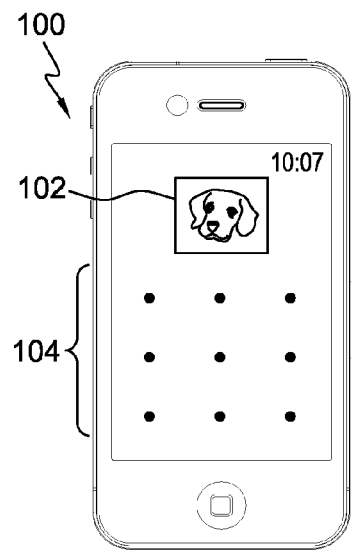
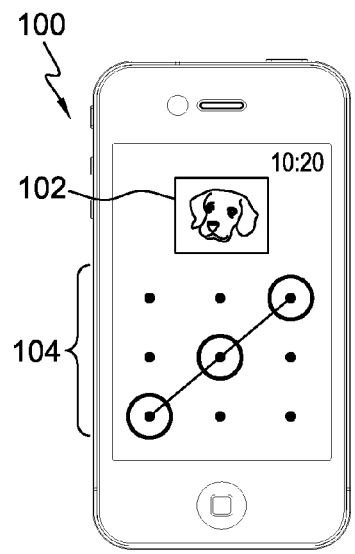
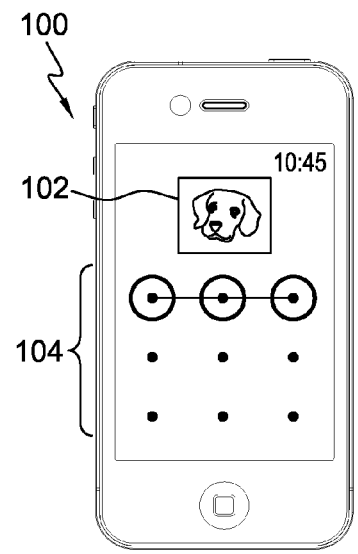
FIG. 1A   FIG. 1B   FIG. 1C
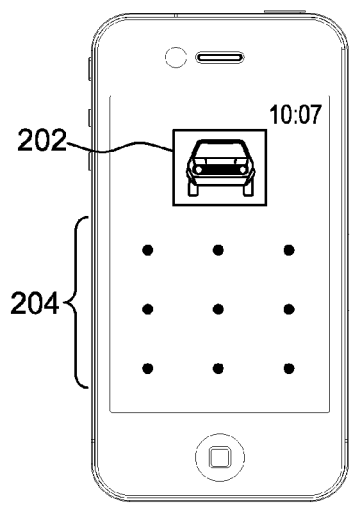
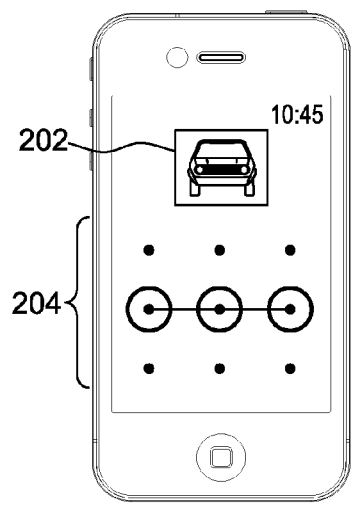
FIG. 2A   FIG. 2B

VARIABLE IMAGE PRESENTATION FOR AUTHENTICATING A USER

BACKGROUND

Security of mobile devices and other processing devices is a primary concern given society's expanded reliance on technology and ever-increasing ability to store private or other sensitive data on these devices. Mobile devices, for instance, have transformed from mere 'cell phones' to enterprise-capable devices enabling e-business and other important tasks to be performed on-the-go. With expanded features comes expanded risk, for instance the risk of an intruder gaining access to an end-user's mobile device. Aspects described herein facilitate increased security on processing devices, such as mobile devices, without significant overhead burdening the end-user.

Current solutions lack any element of depth in terms of securing log-ons to a mobile device; the log-on procedure is the same every time the user picks up the mobile device. For instance, a user who has set a 4-digit passcode to gain access to the mobile device brought out of standby is to provide, unvaryingly, that same passcode each time the mobile device is brought out of standby. This renders the user vulnerable to an over-the-shoulder attack in which a malicious party visually observes the passcode that the user types-in. That malicious party is later able to 'authenticate' with the device using that passcode. Other attacks may be directed at learning the end-user's log-in pattern through software-based or other intelligence tools. Further, some prior art solutions grant only a single access with no distinction in the role or permissions-level of the granted access.

BRIEF SUMMARY

Shortcomings of the prior art are overcome and additional advantages are provided through the provision of a method that includes performing an authentication procedure to determine whether a user is authenticated to use a processing device, the performing including: automatically selecting a graphical image, from a plurality of graphical images, for presentation to the user based on activation of the processing device, the plurality of graphical images being associated with predefined authenticators corresponding to at least one authentication type of a plurality of authentication types; presenting using a graphical display of the processing device, the selected graphical image to the user; and determining, based on input received from the user by way of an input device of the processing device, and based further on the authenticator associated with the selected graphical image, whether the user is authenticated to use the processing device.

Further, a computer readable storage medium readable by a processing circuit and storing instructions for execution by the processing circuit is provided for performing a method that includes: performing an authentication procedure to determine whether a user is authenticated to use a processing device, the performing including: automatically selecting a graphical image, from a plurality of graphical images, for presentation to the user based on activation of the processing device, the plurality of graphical images being associated with predefined authenticators corresponding to at least one authentication type of a plurality of authentication types; presenting using a graphical display of the processing device, the selected graphical image to the user; and determining, based on input received from the user by way of an input device of the processing device, and based further on the authenticator associated with the selected graphical image, whether the user is authenticated to use the processing device.

Yet further, a computer system is provided that includes a memory and a processor in communications with the memory, wherein the computer system is configured to perform a method, said method including: performing an authentication procedure to determine whether a user is authenticated to use a processing device, the performing including: automatically selecting a graphical image, from a plurality of graphical images, for presentation to the user based on activation of the processing device, the plurality of graphical images being associated with predefined authenticators corresponding to at least one authentication type of a plurality of authentication types; presenting using a graphical display of the processing device, the selected graphical image to the user; and determining, based on input received from the user by way of an input device of the processing device, and based further on the authenticator associated with the selected graphical image, whether the user is authenticated to use the processing device.

Additional features and advantages are realized through the concepts of aspects of the present invention. Other embodiments and aspects of the invention are described in detail herein and are considered a part of the claimed invention.

For instance, the predefined authenticators and the at least one authentication type may be chosen by the user, where the method further includes receiving from the user, for each graphical image of the plurality of graphical images, an authentication type and authenticator to associate with the graphical image.

Further, the selecting of the graphical image may randomly select the graphical image from the plurality of graphical images. Additionally or alternatively, the method can further include identifying a subset of graphical images of the plurality of graphical images as candidate graphical images for selection, where the selecting selects the graphical image from the identified subset of graphical images.

In some examples, identifying the subset is based on a current usage context of the processing device. The identifying may include, for instance, selecting a desired minimum level of authentication strength based on the current usage context, and identifying which graphical images of the plurality of graphical images are associated with an authenticator and corresponding authentication type satisfying the minimum level of authentication strength, wherein graphical images associated with an authenticator and corresponding authentication type satisfying the minimum level of authentication strength are included in the subset. Additionally or alternatively, the identifying may include selecting, based on the current usage context, a user-permission level that is enabled for using the processing device, and identifying which graphical images of the plurality of graphical images are associated with an authenticator satisfying the user-permission level, wherein graphical images associated with an authenticator satisfying the user-permission level are included in the subset.

The selection of the graphical image may automatically select multiple graphical images from the plurality of graphical images for presentation to the user based on activation of the processing device, where the presenting simultaneously presents the multiple graphical images to the user. In some embodiments, each graphical image of the multiple graphical images is associated with a different authenticator of the predefined authenticators and is associated with a different user-permission level of multiple user-permission levels, where the user chooses one graphical image of the multiple graphical images, where the determining determines that the input received from the user matches the authenticator associated with the chosen graphical image, and where the method further comprises authenticating the user to use the processing device at the user-permission level associated with the chosen graphical image.

In some examples, the presenting of the selected image(s) presents to the user the selected graphical image(s) along with at least one other graphical image, where the at least one other graphical image is presented as a decoy, and based on selection of any graphical image of these decoy graphical image(s), the method further includes placing the processing device into a heightened state of security awaiting interaction with a remote device for a subsequent authentication.

Advantageously, selecting, perhaps randomly, an image from multiple possible images (each being associated with a predefined authenticator), presenting that selected image to the user, and requiring that the user to input the correct authenticator associated with that image, provides improvement against over-the-shoulder and other attacks. For instance, with conventional mobile device locking systems, if the user unlocks his mobile device during a meeting, reunion, or other context in which people are present and can see what the user enters, a nefarious observer can see and memorize the user's input, then use it later to gain access to the device. Aspects described herein instead utilize multiple different passwords, initially setup and each associated with a different image that is to be randomly or inconsistently presented when the device is brought out of standby. The display of the image is a prompt, to the user, for the password associated with the image. Advantageously, it is much harder for a nefarious observer to observe and memorize each of these passwords, let alone successfully supply each one at the appropriate time. By adding the "image" factor in which the selected image is displayed for the user when the user attempts to activate (e.g. turn on or resume from standby) the device, it assists the user in recalling and providing the appropriate password because of the association between the image and the password. Some studies prove that people can memorize an item more easily if is associated with a graphical image.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 1A-1C depict an example of a presented graphical image that is associated with a first authentication type and corresponding incorrect and correct authenticators of that first authentication type, for use in unlocking a mobile device based on the presented graphical image, in accordance with aspects described herein;

FIGS. 2A-2B depicts another example of a presented graphical image that is associated with the first authentication type and a corresponding correct authenticator of that first authentication type, for use in unlocking a mobile device based on a different presented graphical image, in accordance with aspects described herein;

DETAILED DESCRIPTION

Figure 3:
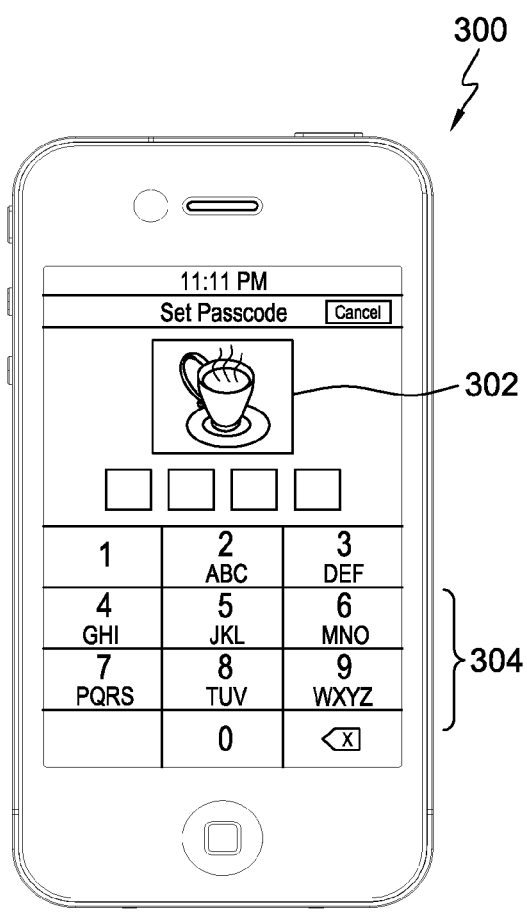
FIG. 3 depicts another example of a presented graphical image that is associated with a second authentication type and corresponding correct authenticator of that second authentication type, for use in unlocking a mobile device based on a different presented graphical image, in accordance with aspects described herein.

It is known that human mind memorization improves when the elements to be memorized are tied to a graphical image or other type of visual element. Accordingly, aspects described herein provide a two dimensional security approach to authentication of a user to use a processing device, such as a mobile processing device (referred to herein as "mobile devices"). Examples provided herein are described and depicted with respect the unlocking of mobile devices, though it will be appreciated that the aspects described herein may be readily applied to other types of authentication for other types of processing devices.

Mobile devices, such as cellular telephones, smartphones, tablet computers, laptops, portable media/gaming devices, and other mobile processing devices, typically place a software 'lock' on the screen and/or other input/output devices of the processing device, for instance when the device goes into a standby or limited processing mode. As a specific example, many smartphones will turn off the touchscreen after a set number of seconds or minutes and the user is forced to 'wake' or 'unlock' the device by, for instance, pressing a button, to further interact with the device.

As described herein, a user selects multiple graphical images (such as icons, images, background pictures, photos from personal and/or public collections, etc) and relates each graphical image to a particular authentication type and particular authenticator. In the mobile device realm, there are numerous possible authentication types, each generally involving input by a user by way of some input device of the mobile device. Inputting an alphanumeric password, inputting a numeric passcode, drawing a shape, tracing a path to connect graphical elements, such as dots, providing a gesture, selecting from a plurality of choices, or speaking a word or phrase are just some examples of an authentication type.

The authenticator of a given authentication type is actual input that is to be received in order to authenticate the user, and encompasses, for instance, the alphanumeric password/passcode, correct path, correct gesture, etc. that is expected to be received to authenticate. The authentication type is the general category of authentication (inputting of a password or passcode, drawing of a shape, tracing of a path, etc.).

By way of specific example, one authentication type is inputting a password. In this case, the user authenticates by typing a particular alphanumeric password. The authentication type is the general means by which the user authenticates (e.g. 'input a password'), while the authenticator is the actual alphanumeric string that constitutes the password, in this example.

As a second example, the authentication type may be the tracing of a path to connect dots of a matrix of dots presented on the lock screen, in which case one possibility for the authenticator is a trace across the top row of dots, from left to right. Again, the authentication type is the general means by which the user authenticates (e.g. 'trace a path of dots'), while the specific authenticator is, in this example, the trace from the top left dot of the matrix to the top right dot.

A user who sets up the locking mechanism of the mobile device can choose both the authentication type and the actual authenticator. For instance, the user may first select the authentication type to use, and then input a specific authenticator of that authentication type.

In accordance with aspects described herein, a user selects multiple graphical images (such as icons, images, background pictures, photos from personal and/or public collections, etc) and relates each graphical image to a particular authentication type and particular authenticator of that authentication type. For instance, a user may select a picture, then select an authentication type of 'draw a shape', then provide a specific authenticator (by drawing the shape) of that authentication type. The user may draw an 'x' shape, for instance. The authentication type (draw a shape) and the authenticator (the 'x' shape) will then become associated with that selected picture.

This may be repeated for multiple other graphical images. For instance, the user may associate a selected icon to the authentication type 'draw a shape' (as is the case above), but the authenticator may be a 'y' shape. The user may also select a background picture and associate that picture with authentication type 'input a password' and specify the authenticator to be the alphanumeric password "20wDR".

In this initial configuration process, the user has selected multiple images and has associated each image with an authentication type (which may not be unique) and a an authenticator of that authentication type.

It is seen that each graphical image is associated with a particular authentication type and particular authenticator of that authentication type. Multiple images may be associated with a common authentication type (such as 'input a password'). Within a given authentication type, multiple images may be associated with the same authenticator or different authenticators, though for reasons that are apparent from the present description, it may not be wise for a user to use the same authenticator for multiple images.

After this initial setup by the user to select a plurality of images and predefine authenticators and authentication types to associate with each image, the user activates (if not already activated) a software-based locking module of the mobile device. With this being active, and upon some activation (e.g. unlock) of the mobile device, for instance turning on the device, waking the device from standby, or waking the screen, as examples, the mobile device selects and displays one (or more) of the images of the plurality of images. The selection may be made according to any desired selection scheme, such as in a random fashion, round-robin fashion, or any other scheme.

The display of an image is a prompt for the user to supply the correct credentials associated with that image. In some examples the credentials include just the authenticator, in which the device presents the graphical image along with a proper interface for the user to supply the authenticator. As an example, if the image is a picture of a puppy and the authentication type is to trace a path of dots, the device may display the picture of the puppy along with a matrix of dots. Alternatively, the user may be forced not only to input the proper authenticator (path of dots) but also to first identify the proper authentication type associated with the picture of the puppy. For instance, the device might present the image of the puppy along with a plurality of authentication type selections (such as buttons) for the user to pick an authentication type. Authentication type selections may include individual buttons for inputting a password, tracing a path, capturing a gesture, and so forth. The user then selects an authentication type and the device then presents an interface to allow the user to input an authenticator of the selected authentication type. In some examples, if the user selects an incorrect authentication type for the presented image, the device could treat that as a failed authentication. Thus, authentication could be based on whether the authentication type that the user selected was the correct one for that image, and/or whether the authenticator actually input by the user was the correct authenticator for that image.

Assume that a user has previously selected three images, one of a puppy, one of a car, and one of a coffee cup. The user has associated the puppy with the authentication type 'trace a path of dots', and the particular authenticator is to trace a path from the top left dot of a dot matrix to the top right dot of the dot matrix. The user has associated the car with the authentication type 'trace a path of dots', and the particular authenticator is to trace a path from the middle left dot of the dot matrix to the middle right dot of the dot matrix. Lastly, the user has associated the coffee cup with the authentication type 'input a passcode', and the particular authenticator is to input the passcode "0-5-2-9".

FIGS. 1A-1C depict an example of a presented graphical image (the puppy) that is associated with a first authentication type (trace a path of dots) and corresponding incorrect and correct authenticators of that first authentication type, for use in unlocking a mobile device based on the presented graphical image, in accordance with aspects described herein. Referring to FIG. 1A, an interface 100 is displayed based on a user activating the device. The device has randomly selected the image of the puppy from the three images, and has displayed that image 102. The device also displays a 9-dot matrix 104 to enable the user to input an authenticator of that authentication type. The display of the image of the puppy is a prompt for the user to input the authenticator that the user previously associated with that image. If the input authenticator matches the one associated with the image of the puppy, the user is authenticated. Therefore, input of a trace extending from the bottom left dot to the top right dot, as in FIG. 1B, is incorrect and the user will not be authenticated to use the device. FIG. 1C depicts the correct authenticator—a trace from the top left dot to the top right dot of the matrix 104.

FIGS. 2A-2B depicts another example of a presented graphical image (the car) that is associated with the first authentication type (trace a path of dots) and a corresponding correct authenticator of that first authentication type, for use in unlocking a mobile device based on a different presented graphical image, in accordance with aspects described herein. In this example, the authentication type is the same as in FIGS. 1A-1C, but the authenticator is different. Upon some later activation of the device, the device selects and presents to the user the image of the car, i.e. image 202. Thus, the correct authenticator is a trace from the middle left dot of dot matrix 204 to the middle right dot of dot matrix 204.

The device may be configured so that the authenticator, and therefore the authentication type, necessary to unlock the device corresponds to the image presented to the user on the lock screen for a given unlock attempt. Varying, each time the device is activated, the image being selected and presented on the lock screen varies the authenticator needed to unlock the device. Therefore, the selection of the image to present to the user, and therefore the proper authenticator and authentication type expected for unlocking the device, may be varied from one activation (e.g. unlock) of the device to another. Selecting from a group of many images, in which the image being selected and presented is varied, provides a more secure way to logon to the mobile device. Another factor of security is added by allowing the user to select any arbitrary number of images and associate authentication types/authenticators to those images. The images, when presented to a user on a particular unlock attempt, serve as a key to trigger the user to input the correct authenticator. When the user attempts to unlock the mobile device, the user will be prompted with an image and the user must provide the authenticator associated with that image in order to authenticate properly with the mobile device.

Example authentication types include those noted above, such as entering a password, passcode, or trace of dots, drawing a shape or other picture, providing a gesture (captured by the device's camera as an example), speaking a word of phrase, or selecting between multiple graphical elements, as examples.

As noted, the graphical images that the user chooses to associate with an authenticator and authentication type could be drawn from sources of images familiar to the user, for instance a group of photos that the user has uploaded or has retained on the user's device. The user's familiarity with the images can help the user more easily correlate and recall the particular authenticator associated with the image.

It may be advantageous for the user to vary the authenticators chosen and associated with images. For instance, using the example above, the user has used two different traces, one for each of the puppy and the car. It is wise for the user to predefine a different authenticator (trace) for each of those. Enhanced security is realized when the user uses unique authenticators across all of the images, regardless of the authentication type(s) being used. Using the same authenticator for all or some of the images associated with a common authentication type may make it easier for a nefarious individual to authenticate with the device.

Returning to the example above in which the user has associated the image of the coffee cup with a passcode, FIG. 3 depicts the example where the graphical image selected and presented to the user on an unlock attempt is the coffee cup. The coffee cup is associated with the authentication type 'input a passcode' and corresponding authenticator (0-5-2-9) of that authentication type. When the coffee cup is selected for presentation to the user based on activation of the device, interface 300 presents the image 302 of the coffee cup and a numeric 'soft' keypad 304 for the user to enter the 4-digit passcode.

Figure 4:
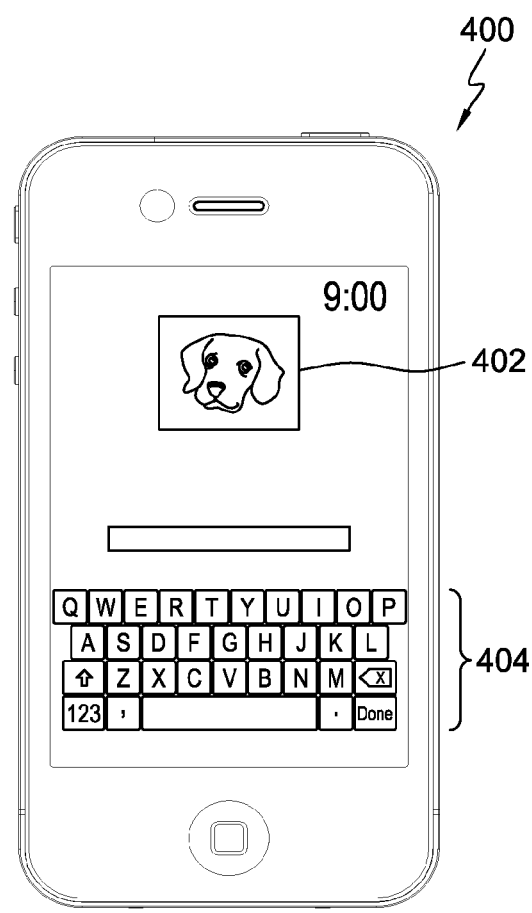
FIG. 4 depicts yet another example of a presented graphical image that is associated with a third authentication type and corresponding correct authenticator of that third authentication type, for use in unlocking a mobile device based on a different presented graphical image, in accordance with aspects described herein.

FIG. 4 depicts yet another example of a presented graphical image that is associated with a third authentication type and corresponding correct authenticator of that third authentication type, for use in unlocking a mobile device based on a different presented graphical image, in accordance with aspects described herein. The example of FIG. 4 depicts the 'input a password' authentication type. In this example, the user has previously associated an image of a puppy 402 with the 'input a password' authentication type, and has previously predefined a password as the authenticator that must be input to authenticate with the device. Interface 400 would therefore, upon activation of the device and selection of image 402, present an alphanumeric keypad 404 by which the user would enters the password to authenticate with the device.

Figure 5:
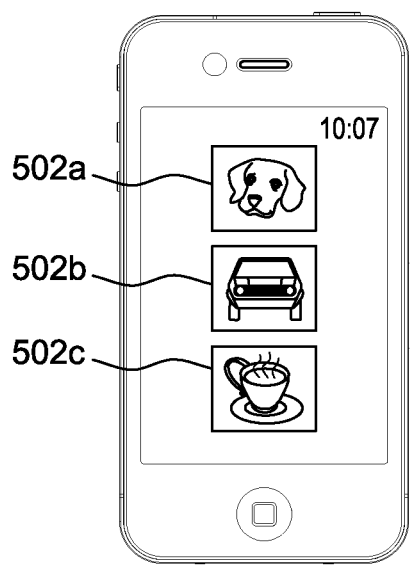
FIG. 5 depicts an example of presenting multiple graphical images to a user for selection, in accordance with aspects described herein.

Previously mentioned is the ability to present multiple images to the user upon activation of the device. FIG. 5 depicts an example of presenting multiple graphical images 502a, 502b, 502c to a user for selection, in accordance with aspects described herein. The presentation of multiple images when a user activates the device could be used in different ways.

In one example, the presentation of multiple images is another authentication type, in which multiple graphical elements (pictures in this example) are presented to the user, and only one of them is the correct authenticator. For instance, the user may specify that a picture of a car is to be the correct authenticator when the picture of the car is presented along with other images. When the image of the car is presented, selection of any of the other images will be regarded as an authentication failure.

Figure 6:
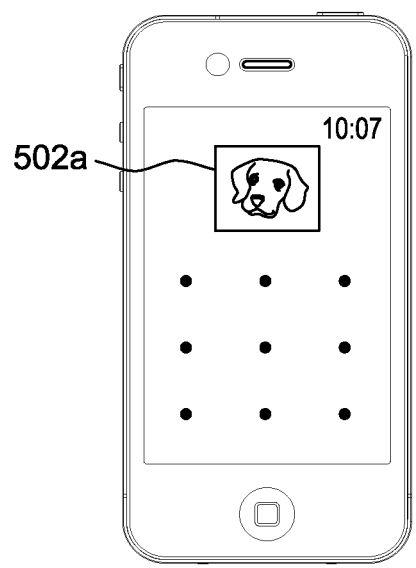
FIG. 6 depicts an example in which the selected graphical image of FIG. 5 is presented to the user based on selection thereof by the user, for use in unlocking a mobile device based on the presented graphical image, in accordance with aspects described herein.

In another approach, upon activation of the device, the device selects multiple of the images that the user has configured with authenticators, and presents them all to the user. The user is enabled to select any of them and input the appropriate authenticator for the image that the user selected. This provides the user with a choice as to which presented image the user wishes to use for authenticating with the device. If the user selects the image 502a of the puppy, for instance, which is associated with the authentication type of 'trace a path', the device can then present a dot matrix as depicted in FIG. 6, based on the user's selection of the puppy. If the user instead selected the image 502c of the coffee cup, the interface as shown in FIG. 3 will be presented.

Figure 7:
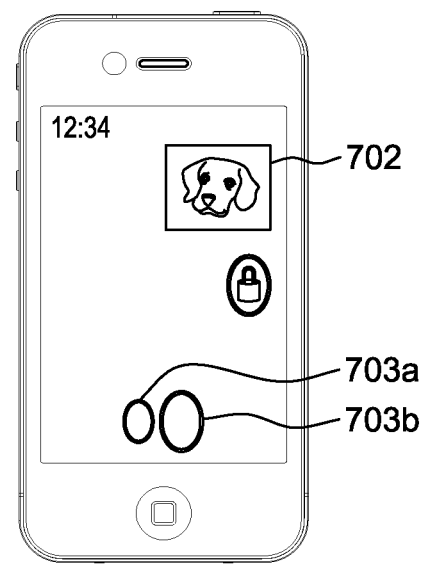
FIG. 7 depicts another example of a presented graphical image that is associated with a fourth authentication type for use in unlocking a mobile device based on a different presented graphical image, in accordance with aspects described herein.

FIG. 7 depicts another example of a presented graphical image that is associated with a fourth authentication type for use in unlocking a mobile device based on a different presented graphical image, in accordance with aspects described herein. In this example, the user has associated the image 702 of the puppy with multiple graphical images 703a and 703b. The authenticator in this case is one of the two elements 703a or 704b, specifiable by the user.

Additionally or alternatively, the user may have options for authenticating at different user-permission levels. Mobile and other types of devices may be configured with different user-permission levels that enable user(s) to log on with different privileges. An administrator user may be given heightened security privileges, while a restricted user may be given only restricted privileges, like the ability to launch only a limited range of applications of the device. Alternatively, a single user account may have the option to authenticate at different levels of security for a given logon session depending on what tasks the user needs to accomplish during that session. In these cases, the user may desire to occasionally, but not always, logon at a heightened level of security.

In one embodiment, the user is presented with multiple graphical images (e.g. 703a and 703b of FIG. 7, or 502a, 502b, 502c of FIG. 5), each being associated with a different user-privilege level. Using the example of FIG. 7, 703b may be associated with a minimum security level (such as 'anonymous') in which case the user selects image 703b and need not supply any authenticator to logon to the device. Image 703a may be associated with a heightened security level. When the user desires to logon at the heightened user-privilege level, the user selects image 703a and is presented with an interface to enter the appropriate authenticator associated with image 702, or perhaps associated with image 703a.

Returning to the example of FIG. 5, the three images 502a, 502b, 502c may each be associated with a different user-privilege level and each associated with a different authentication type and authenticator. Authenticators and/or authentication types may have different inherent strength in terms of security. For instance, a password that is 16 characters long may be considered a stronger authenticator than a password that is 4 characters long. Similarly, an authentication type of selecting between three presented images may be considered a weaker authentication type than that of tracing a complex path of 15 dots, as examples. Consequently, a presented image may be associated with a highest level of security, i.e. that image may be one that has associated with it the strongest authenticator/authentication type. Lower levels of security may be associated with images having associated with them relatively weaker authenticator/authentication types.

The selection, by the device, of the image(s) to present to the user for purposed of authenticating with the device may be based on a current usage context of the device. Current usage context refers to the context under which the device is currently being used. It is determined from one or more device usage parameters, examples of which include the time (clock time, day, week, month, year, time of year, etc.), user-type, location (physical, GPS location), location-type (home, work, etc), connection status of the device, such as a current network connection to a trusted network, or any other parameter describing a context under which the device is currently operating. Current usage context can inform the device of an appropriate relative level of security to require to in order to unlock the device.

If the current usage context indicates that the device in the user's own home (as determined based on GPS location of the device and/or connection to the user's home Wi-Fi network, as examples), then a relatively low level of security in terms of unlocking the device may be appropriate. In one example, the device bypasses the lock screen, presenting no image to user. In another example, a relatively low authentication strength is chosen, and a subset of the plurality of images initially setup by the user with an authenticator is identified as candidate images to present to the user. The images for inclusion in the subset are those having a relatively low-strength authenticator/authentication type associated with them, and the selection of the image(s) to present to the user based on the user activating the device is drawn from that subset. This could advantageously reduce the burden on the user; instead of presenting to the user an image associated with a high-strength authenticator, such as a 16-character password, the device would filter out those types of images because the user is at home. The device would effectively limit the set of candidate images from which the device will pick to present to the user. The device will present the user with an image associated with a relatively low-strength authenticator, such as a 4-character password or a 'trace a pattern' type authenticator.

The converse is also true, in which if the current usage context indicates that the user is likely in a public or otherwise non-secure area (susceptible to observation), then a minimum level of authentication strength may be selected and the images having associated authenticators/authentication types satisfying that minimum level of authentication strength can be candidates for selection to present to the user.

The current usage context might also dictate a user-permission level that is currently enabled to access the device. It may be desirable for the user to restrict usage of the device when it is in public to administrator-only access, for instance. A user-permission level may therefore be associated with each of the images, and, using this scenario, only the images associated with the administrator user-permission level will be identified as candidates for presenting to the user to authenticate with the device.

The plurality of images that the user associated with authenticators/authentication types can be indicated, either manually by the user or automatically by the device, as being available for display under particular usage contexts, if desired. For instance, images selected from a private digital photo album of the user may be candidates for selection and presentation to the user only when the device is determined to be in a non-public place, such as the user's home. These images will not be included in the subset of candidate images if the device is determined not to be located at the user's home. This is advantageous in circumstances where the user does not wish a personal private picture to be selected and displayed while in a public place when the user activates the device.

Assume, for instance, that the user has associated 10 different pictures to 10 different authenticators of 4 different authentication types. When current usage context indicates that the device is located at the user's home, all 10 of the pictures may be selected as candidate pictures for selecting and presenting to the user when the user attempts to unlock the device. In this case, the device may randomly select and present on the lock screen any one (or more) of the 10 pictures to the user. If instead the current usage context indicates that the device is located in a public place, the subset of candidate pictures from which the selection and presentation by the device is drawn may be limited to only 5 of these images. As an example, the 5 images may be those associated with a particular minimum authentication strength and/or user-permission level necessary for the current context. As another example, they may be those pictures of the 10 total that were taken from a source other than the user's private digital photo album.

The sensitivity of an image for display under given contexts and/or the authentication strength associated with the image may be manually applied by a user or automatically inferred by the device. Examples above involve pictures in a private digital photo album of the user, which may safely be assumed to be sensitive and ineligible for selection and presentation to a user when the device is located in a public place. Similarly, it may be automatically determined based on policies setup with the device that a particular authenticator is complex enough to satisfy a particular authentication strength.

According to aspects described herein, when a user attempts to unlock a mobile device or other processing device, the device will randomly and/or based on current usage context select and present one or more graphical images that the user has previously selected and associated to authenticator(s). The user inputs an authenticator and the device determines, based on that input and on the authenticator that was previously associated with the image, whether the user is authenticated to used the device. As an example, a direct comparison is made between the input and the authenticator associated with the input, and the user is authenticated if the two match. In other examples, such as those involving the drawing of a picture or the user supplying a hand gesture to a camera of the device, a direct comparison would be improper because the input is unlikely to be the exact same as that which was previously defined by the user. Various comparison techniques may be applied under these circumstances to compare the two inputs and determine whether they are sufficiently similar to establish that the user is authenticated to use the device.

If a user supplies an incorrect authenticator, it can be handled in various ways. The user may be given a limited number (zero or more) of failure attempts before placing the device into a heightened state of security, as an example. If a device is placed into a heightened state of security, it may be locked from all access for some duration of time, and/or until the user unlocks the device via a web-based or other provider. Additionally or alternatively, the device may regard a failed attempt as a trigger to narrow the subset of candidate images to those associated with higher minimum authentication strengths, and the device then selects from that narrowed subset another image associated with a higher authentication strength to present to the user.

Advantageously, the varying selection of image(s) from multiple possible images, each associated with a predefined authenticator and authentication type, enables variability in the authenticator that is suitable for unlocking a device at a given time. An authenticator that is enabled to unlock the device at a given time may not be enabled to unlock the device at some later time, i.e. when a different image is presented to the user. The ability for an authenticator to unlock a device is dependent on the selection and presentation of the graphical image associated with that authenticator on a given activation attempt. This can provide improvement against malicious attacks that are designed to learn of the user's password that is effective at some given point in time. If the user has predefined several authenticators associated with several images, say 50 different authenticators with 50 different images, then it may take many unlock attempts before the graphical image associated with an authenticator that was previously used is re-encountered. The randomness or inconsistency in providing the graphical image to a user when attempting to activate the device makes it difficult for a person with knowledge of the single authenticator to gain access to the device. The number of failed attempts after which lockout occurs may be tailored sufficiently small (say 3) compared to the number of candidate graphical images available for presentation to the user upon an unlock attempt. If the candidate images total 50 different possibilities, chances are that the user will not encounter the image for which he/she knows the proper authenticator in the 3 failure attempts allotted before a lockout occurs.

An enterprise could utilize aspects described herein to enhance security of devices used by the enterprise users. A remote management application may be provided for users/administrators to manage aspects of the software-based locking module, such as user's authenticators and authentication types. This can be used to enforce enterprise policies on authenticators, authentication types, and so forth. It may also be used to set authenticators and associated graphical images, which can then be pushed as updates via a device management system that runs an agent on each device. The devices may be individual nodes of a cloud or other type of computing environment, as an example. The device management system can be used to perform actions such as setting the user's authenticator changes, enforcing authentication strength policies, and resetting device settings.

If the device is lost, this system can be used to remotely lock the device. If the user forgets an authenticator or is otherwise unable to authenticate with the device, an email can be sent to the user or the user can login to the remote management application via some other device (using the user's standard enterprise credentials for logging in) to make changes to the authenticators. Additionally or alternatively, the remote management application may be used to unlock a locked device, for instance after it is established that the device has not been compromised.

Aspects described herein present variable logon facilities based on an additional factor in which a graphical image of possibly many graphical images is selected and presented to the user, and is associated with an authenticator that is currently enabled for unlocking the device. Facilities are also provided in which a user sets different authenticators for authenticating with a mobile device.

Figure 8:
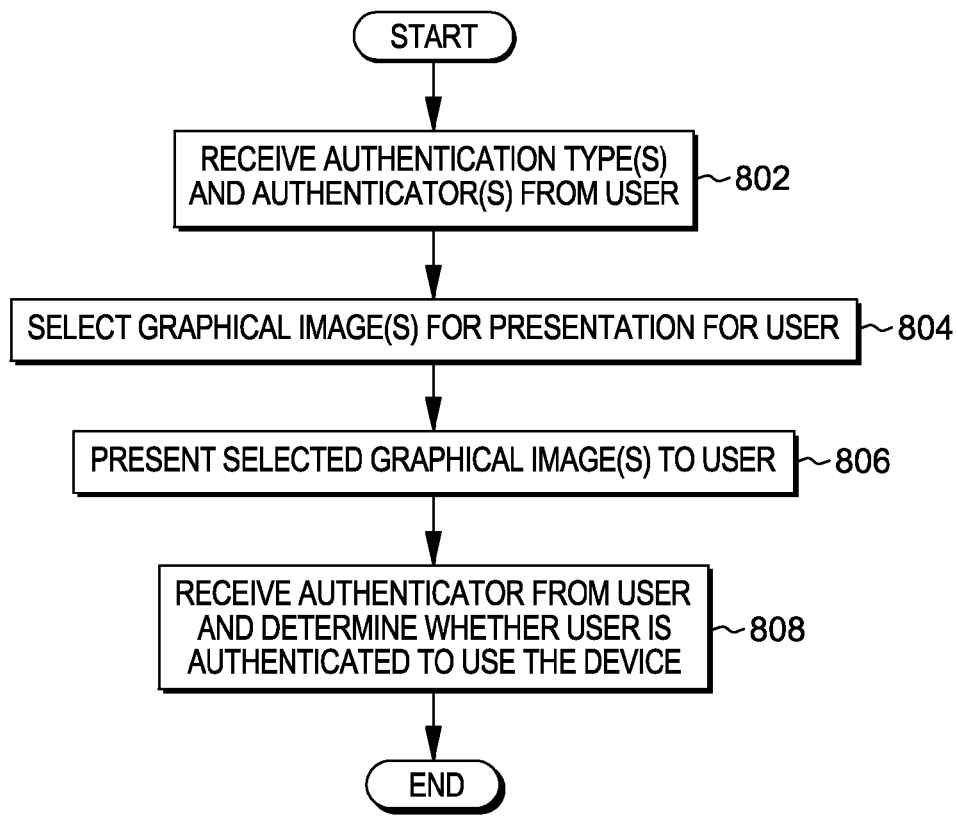
FIG. 8 depicts an example process for an authentication procedure to determine whether a user is authenticated to use a processing device, in accordance with aspects described herein.

Accordingly, an example process for an authentication procedure to determine whether a user is authenticated to use a processing device is described and depicted with reference to FIG. 8. The method begins by receiving one or more authentication types and one or more authenticators from a user (802). These authenticators and authentication types are associated by the user with a plurality of graphical images, where each provided authenticator is of a particular authentication type of possibly multiple different authentication types, and is associated with a graphical image of the plurality of graphical images. The authenticators and the at least one authentication type are selected by the user for association with the images, which may also be selected by the user.

Each authenticator corresponds to one of the authentication types, and the collection of authenticators may correspond to one or more of the different authentication types of the plurality of authentication types. Example authentication types include inputting an alphanumeric password, drawing a shape, tracing a path to connect a plurality of dots, providing a gesture, dictating a work or phase, or selecting from a plurality of choices, though others are possible.

Next, one or more graphical images of the plurality of graphical images are selected, automatically, in one example for presentation to the user (804). This selection and presentation may be based on activation of the processing device by the user. Activation includes, for instance, an attempt by the user to unlock, awaken, or boot the device. As noted above, the plurality of graphical images are associated with authenticators that have been predefined by the user as part of the receiving in 802. When multiple graphical images were selected from the plurality of graphical images, the multiple graphical images can be presented simultaneously to the user.

The selected graphical image(s) are then presented (806) to user, for instance by way of a graphical display of the processing device. As described herein, the user then provides an authenticator to the device, for instance by typing a password/passcode, tracing a pattern, drawing a picture, or providing a hand gesture, as examples. The device receives the authenticator and a determination is made as to whether the user is authenticated to use the device (808). This determination may be based on the input received from the user and based further on the authenticator associated with the selected graphical image, e.g. via a comparison between the two.

In some examples, the selection (804) of the graphical image(s) from the plurality of graphical images for presenting to the user is a random selection from the plurality of graphical images. Alternatively, the selection may be a random selection from a subset of the plurality of graphical images.

Figure 9:
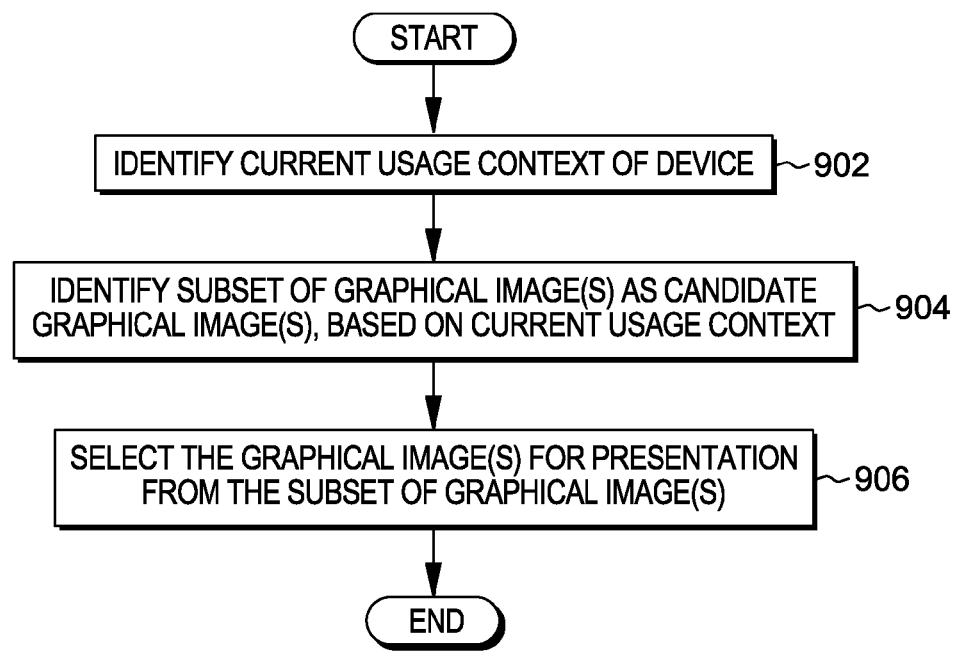
FIG. 9 depicts an example process to select one or more graphical images, from a plurality of graphical images, for presentation to a user, in accordance with aspects described herein.

FIG. 9 depicts an example such process to select one or more graphical images, from a plurality of graphical images, for presentation to the user. In the example of FIG. 9, the selection is based, at least in part, on current usage context of the processing device. The process begins by identifying a current usage context of the device (902). The current usage context describes the context under which the device is being used. The current usage context can include anything identifiable about the device or its use, for instance a location of the device, a status of one or more network or other connections of the device, or a current time, as examples.

Based on the current usage context of the device, a subset of graphical images of the plurality of graphical images are identified as candidate graphical images for selection (904), and the graphical image(s) actually presented to the user are selected from that subset (906).

The identification of the subset can be based on any desirable parameter(s). In some examples, the identification of the subset of images is based on a desired minimum level of authentication strength desired based on the current usage context. In this case, it is identified which graphical images of the plurality of graphical images are associated with an authenticator and corresponding authentication type that satisfies the minimum level of authentication strength. The subset comprises the graphical images (of the plurality) that are associated with an authenticator and corresponding authentication type that satisfies the minimum level of authentication strength.

Additionally or alternatively, the identification of the subset of images is based on a desired user-permission level that is enabled for using the processing device. In this case, it is identified which graphical images of the plurality of graphical images are associated with an authenticator satisfying the user-permission level. The subset comprises the graphical images associated with an authenticator satisfying the user-permission level.

In some examples, each graphical image of multiple graphical images presented to the user is associated with a different authenticator of the predefined authenticators and is associated with a different user-permission level of multiple user-permission levels. In these cases, when the user chooses one graphical image of the multiple graphical images, the determining whether the user is authenticated (808) will determine whether the input received from the user matches the authenticator associated with the chosen graphical image. If so, and the user is authenticated, that user will be authenticated to use the device at the user-permission level associated with the chosen graphical image.

In some examples, it may be desirable to simultaneously present decoy image(s) alongside the graphical image(s) selected for presentation to the user. Selection of a decoy image can cause the system to enter a heightened state of security awaiting some further, more trusted authentication to unlock, such as interaction with a remote device for a subsequent authentication.

The processes of FIGS. 8 and/or 9 may be performed by one or more processing devices. In some examples, it is the mobile or other processing device with which the user is authenticating that performs process(es) described herein. In other examples, a remote processing device in communication with the mobile or other processing device with which the user authenticates performs process(es) described herein. As a third possibility, a combination of the (i) mobile or other processing device and (ii) remote processing device perform process(es) described herein.

Figure 10:
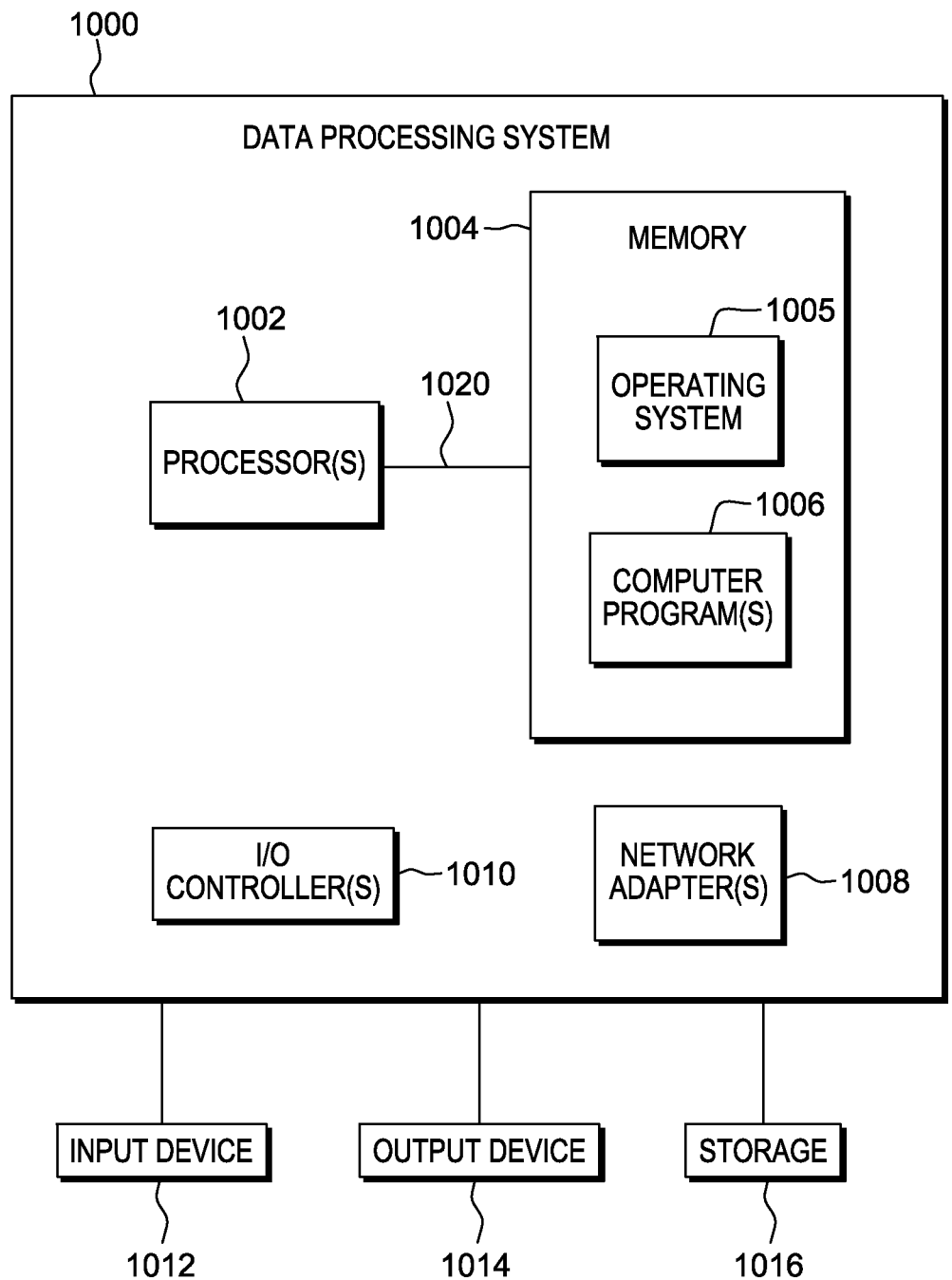
FIG. 10 depicts one example of a processing device to incorporate and use aspects described herein.

FIG. 10 depicts one example of a processing device to incorporate and use aspects described herein. A processing device may also be referred to as a computer system. Processing device 1000 may be based on, for instance, various system architectures such as those offered by International Business Machines Corporation (Armonk, N.Y., USA), Intel Corporation (Santa Clara, Calif., USA), or ARM Holdings plc (Cambridge, England, United Kingdom), as examples.

Processing device 1000 is suitable for storing and/or executing program code and includes at least one processor 1002 coupled directly or indirectly to memory 1004 through, e.g., a system bus 1020. In operation, processor(s) 1002 obtain from memory 1004 one or more instructions for execution by the processors. Memory 1004 may include local memory employed during actual execution of the program code, bulk storage, and cache memories which provide temporary storage of at least some program code in order to reduce the number of times code must be retrieved from bulk storage during program code execution. A non-limiting list of examples of memory 1004 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 1004 includes an operating system 1005 and one or more computer programs 1006, for instance programs to perform aspects described herein.

Input/Output (I/O) devices 1012, 1014 (including but not limited to displays, such as touchscreen displays, microphones, speakers, accelerometers, gyroscopes, magnetometers, light sensors, proximity sensors, GPS devices, cameras, etc.) may be coupled to the system either directly or through I/O controllers 1010.

Network adapters 1008 may also be coupled to the system to enable the processing device to become coupled to other processing devices, storage devices, or the like through intervening private or public networks. Ethernet-based (such as Wi-Fi) interfaces and Bluetooth® adapters are just examples of the currently available types of network adapters 1008 used in processing devices.

Processing device 1000 may be coupled to storage 1016 (e.g., a non-volatile storage area, such as magnetic disk drives, optical disk drives, a tape drive, etc.), having one or more databases. Storage 1016 may include an internal storage device or an attached or network accessible storage.

Computer programs in storage 1016 may be loaded into memory 1004 and executed by a processor 1002 in a manner known in the art.

The processing device 1000 may include fewer components than illustrated, additional components not illustrated herein, or some combination of the components illustrated and additional components. Processing device 1000 may include any computing device known in the art, such as a mainframe, server, personal computer, workstation, laptop, handheld or mobile computer, tablet, wearable device, telephony device, network appliance, virtualization device, storage controller, etc.

Figure 11:
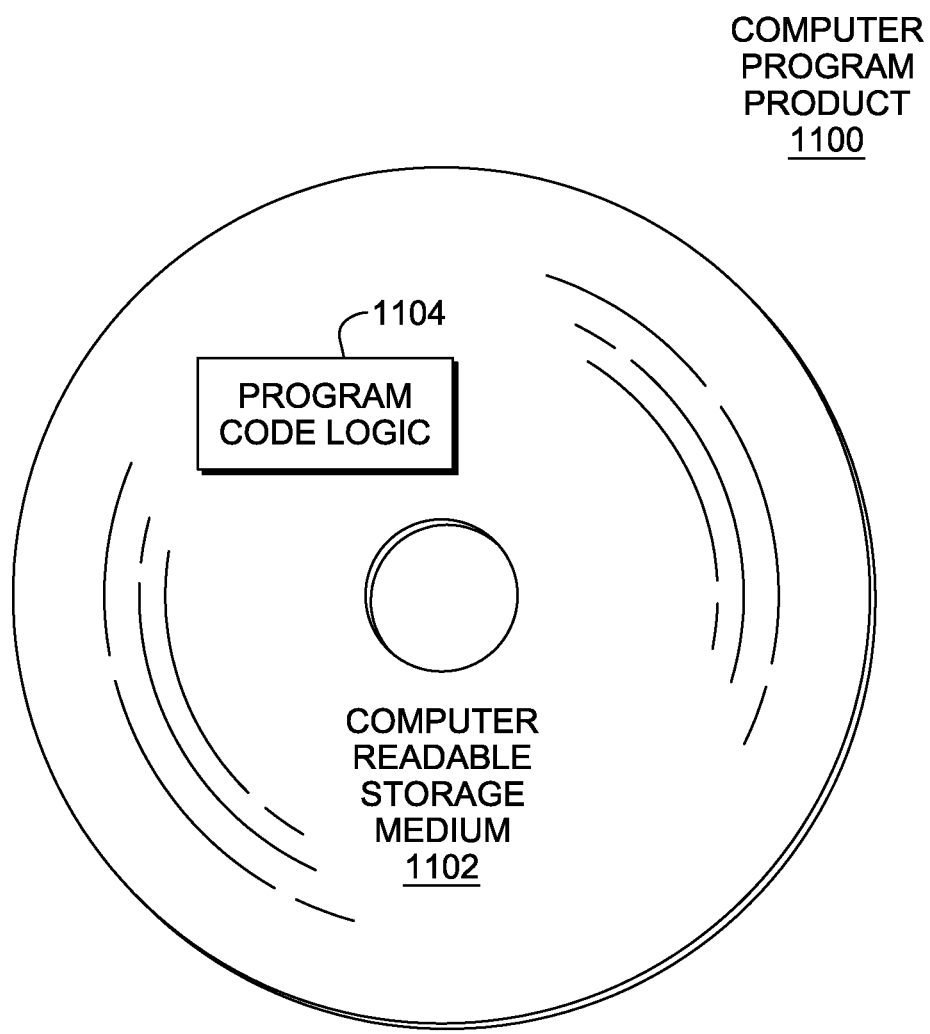
FIG. 11 depicts one embodiment of a computer program product.

Referring to FIG. 11, in one example, a computer program product 1100 includes, for instance, one or more non-transitory computer readable storage media 1102 to store computer readable program code means, logic and/or instructions 1104 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a processing device suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the processing device to become coupled to other processing devices or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
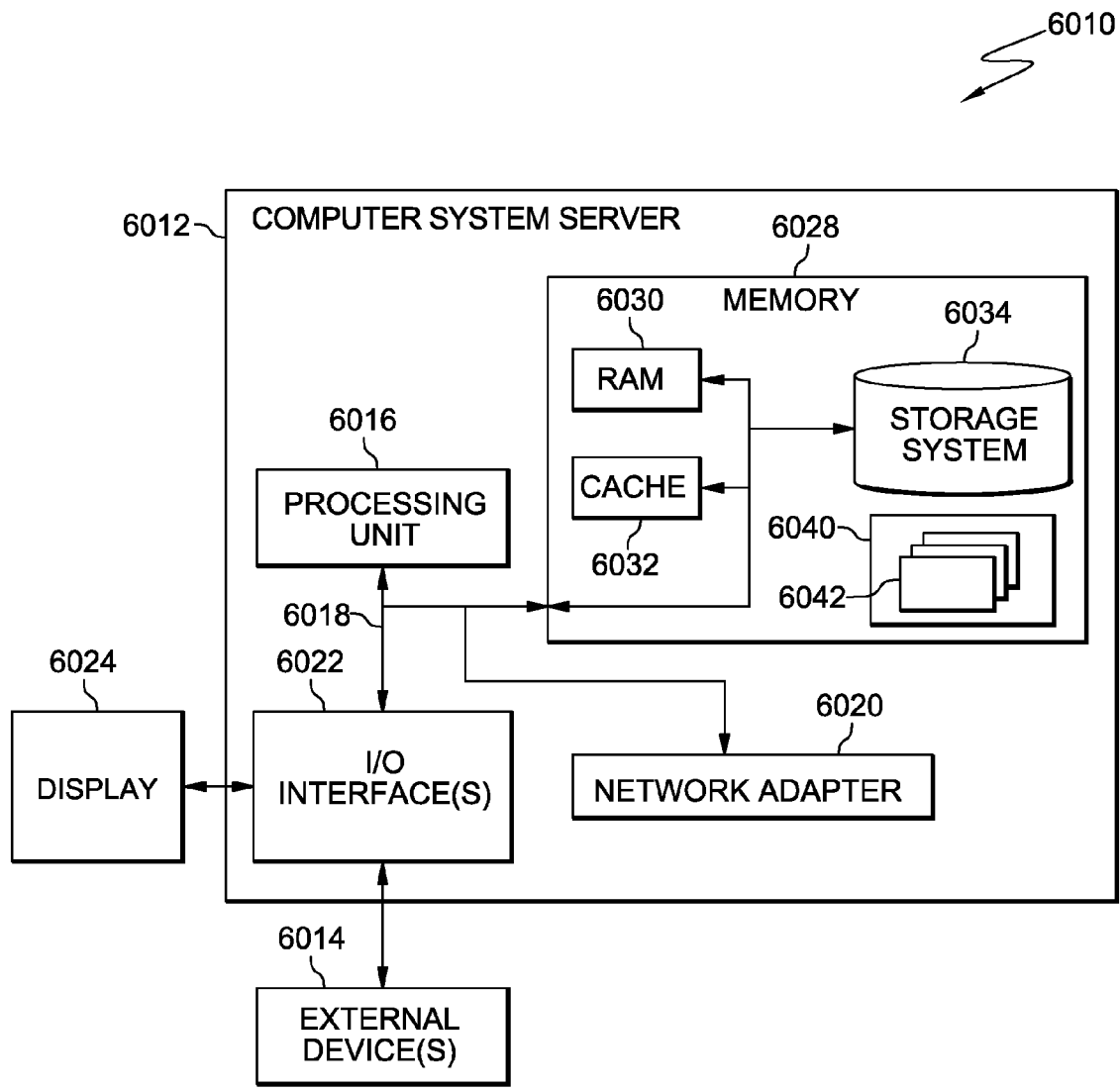
FIG. 12 depicts one embodiment of a cloud computing node.

Referring now to FIG. 12, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, mobile, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 13:
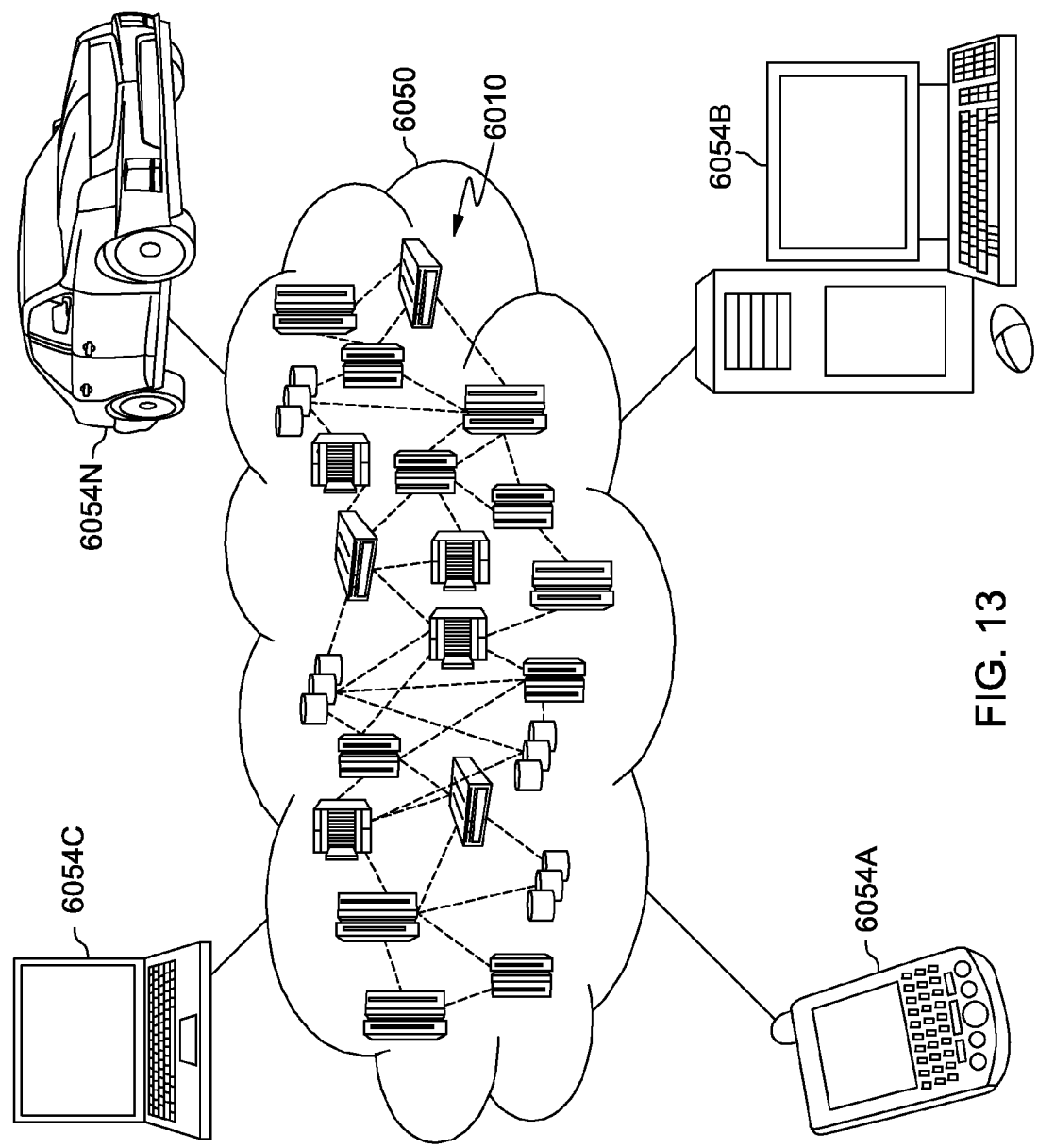
FIG. 13 depicts on embodiment of a cloud computing environment.

Referring now to FIG. 13, illustrative cloud computing environment 6050 is depicted. As shown, cloud computing environment 6050 comprises one or more cloud computing nodes 6010 with which local computing devices used by cloud consumers, such as, for example, mobile processing device 6054A (personal digital assistant (PDA), cellular telephone, smartphone, etc), desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 13 are intended to be illustrative only and that computing nodes 6010 and cloud computing environment 6050 can communicate with any type of computerized device over any type of network and/or network addressable connection (e.g., using a web browser).

Figure 14:
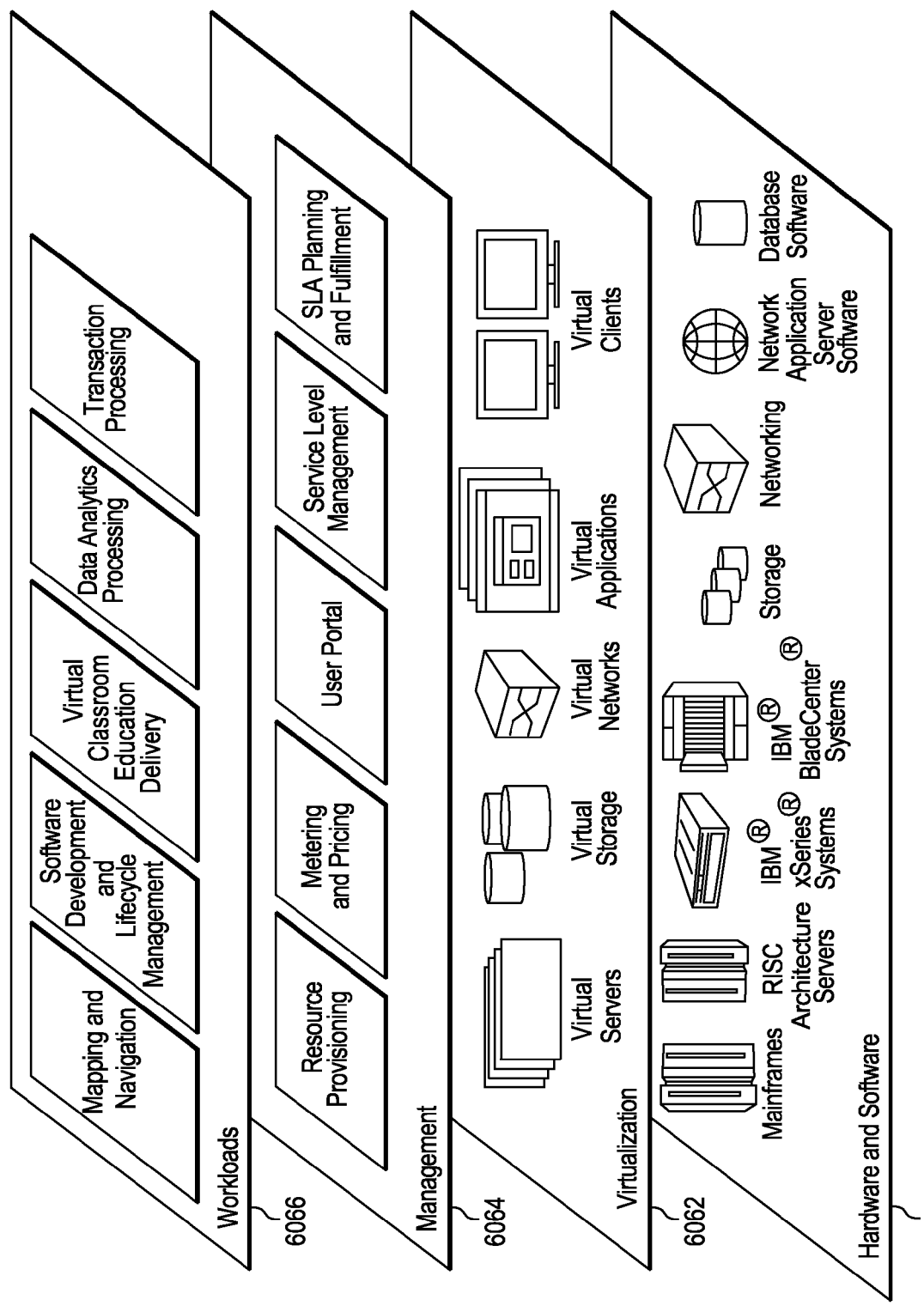
FIG. 14 depicts one example of abstraction model layers.

Referring now to FIG. 14, a set of functional abstraction layers provided by cloud computing environment 6050 (FIG. 13) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising: performing an authentication procedure to determine whether a user is authenticated to use a processing device, the performing comprising: identifying a subset of graphical images of a plurality of graphical images as candidate graphical images for selection, the plurality of graphical images being associated with predefined authenticators corresponding to at least one authentication type of a plurality of authentication types, wherein the subset is identified after a failed attempt by the user to authenticate to use the processing device based on presentation of an initial graphical image of the plurality of graphical images, wherein the failed attempt triggers narrowing the subset to those graphical images of the plurality of graphical images that are associated with a higher minimum authentication strength than an authentication strength associated with the initial graphical image, wherein the subset is identified as including those graphical images of the plurality of graphical images that are associated with the higher minimum authentication strength;

automatically selecting a graphical image, from the plurality of graphical images, for presentation to the user based on activation of the processing device, wherein the selecting selects the graphical image from the identified subset of graphical images;

presenting, using a graphical display of the processing device, the selected graphical image to the user; and determining, based on input received from the user by way of an input device of the processing device, and based further on the authenticator associated with the selected graphical image, whether the user is authenticated to use the processing device.

2. The method of claim 1, wherein the predefined authenticators correspond to multiple different authentication types of the plurality of authentication types, and wherein the plurality of authentication types comprise: inputting an alphanumeric password, drawing a shape, tracing a path to connect a plurality of dots, providing a gesture, or selecting from a plurality of choices.

3. The method of claim 1, wherein the selecting randomly selects the graphical image from the plurality of graphical images.

4. The method of claim 1, wherein the identifying the subset is based on a current usage context of the processing device.

5. The method of claim 4, wherein the identifying the subset of graphical images comprises: automatically selecting a desired minimum level of authentication strength based on the current usage context; and identifying which graphical images of the plurality of graphical images are associated with an authenticator and corresponding authentication type satisfying the desired minimum level of authentication strength, wherein graphical images associated with an authenticator and corresponding authentication type satisfying the desired minimum level of authentication strength are included in the subset.

6. The method of claim 4, wherein the current usage context comprises one or more of: location of the processing device, network connection status of the processing device, or a current time.

7. The method of claim 4, wherein the identifying the subset of graphical images comprises:

automatically selecting, based on the current usage context, a user-permission level that is enabled for using the processing device; and identifying which graphical images of the plurality of graphical images are associated with an authenticator satisfying the user-permission level, wherein graphical images associated with an authenticator satisfying the user-permission level are included in the subset.

8. The method of claim 1, wherein the automatically selecting further comprises automatically selecting multiple graphical images from the plurality of graphical images for presentation to the user based on activation of the processing device, and wherein the presenting simultaneously presents the multiple graphical images to the user.

9. The method of claim 8, wherein each graphical image of the multiple graphical images is associated with a different authenticator of the predefined authenticators and is associated with a different user-permission level of multiple user-permission levels, wherein the user chooses one graphical image of the multiple graphical images, wherein the determining determines that the input received from the user matches the authenticator associated with the chosen graphical image, and wherein the method further comprises authenticating the user to use the processing device at the user-permission level associated with the chosen graphical image.

10. The method of claim 1, wherein the presenting presents to the user the selected graphical image along with at least one other graphical image, the at least one other graphical image presented as a decoy, wherein based on selection of any graphical image of the at least one other graphical image, the method further comprises placing the processing device into a heightened state of security awaiting interaction with a remote device for a subsequent authentication.

11. The method of claim 1, further comprising:

based on presenting the selected graphical image to the user, receiving from the user an indication of an authentication type; and determining whether the authentication type indicated by the user matches the user-selected authentication type associated with the graphical image, wherein the determining whether the user is authenticated to use the processing device is performed based on the determining whether the authentication type indicated by the user matches the user-selected authentication type associated with the graphical image.

12. A computer program product comprising: a computer readable storage medium readable by a processing circuit and storing instructions for execution by the processing circuit for performing a method comprising: performing an authentication procedure to determine whether a user is authenticated to use a processing device, the performing comprising:

identifying a subset of graphical images of a plurality of graphical images as candidate graphical images for selection, the plurality of graphical images being associated with predefined authenticators corresponding to at least one authentication type of a plurality of authentication types, wherein the subset is identified after a failed attempt by the user to authenticate to use the processing device based on presentation of an initial graphical image of the plurality of graphical images, wherein the failed attempt triggers narrowing the subset to those graphical images of the plurality of graphical images that are associated with a higher minimum authentication strength than an authentication strength associated with the initial graphical image, wherein the subset is identified as including those graphical images of the plurality of graphical images that are associated with the higher minimum authentication strength;

automatically selecting a graphical image, from the plurality of graphical images, for presentation to the user based on activation of the processing device, wherein the selecting selects the graphical image from the identified subset of graphical images;

presenting, using a graphical display of the processing device, the selected graphical image to the user; and determining, based on input received from the user by way of an input device of the processing device, and based further on the authenticator associated with the selected graphical image, whether the user is authenticated to use the processing device.

13. The computer program product of claim 12, wherein the identifying the subset is based on a current usage context of the processing device.

14. The computer program product of claim 13, wherein the identifying the subset of graphical images comprises:

automatically selecting a desired minimum level of authentication strength based on the current usage context; and identifying which graphical images of the plurality of graphical images are associated with an authenticator and corresponding authentication type satisfying the desired minimum level of authentication strength, wherein graphical images associated with an authenticator and corresponding authentication type satisfying the desired minimum level of authentication strength are included in the subset.

15. The computer program product of claim 13, wherein the identifying the subset of graphical images comprises:
   automatically selecting, based on the current usage context, a user-permission level that is enabled for using the processing device; and
   identifying which graphical images of the plurality of graphical images are associated with an authenticator satisfying the user-permission level, wherein graphical images associated with an authenticator satisfying the user-permission level are included in the subset.

16. A computer system comprising: a memory; and a processor in communications with the memory, wherein the computer system is configured to perform a method, the method comprising: performing an authentication procedure to determine whether a user is authenticated to use a processing device, the performing comprising: identifying a subset of graphical images of a plurality of graphical images as candidate graphical images for selection, the plurality of graphical images being associated with predefined authenticators corresponding to at least one authentication type of a plurality of authentication types, wherein the subset is identified after a failed attempt by the user to authenticate to use the processing device based on presentation of an initial graphical image of the plurality of graphical images, wherein the failed attempt triggers narrowing the subset to those graphical images of the plurality of graphical images that are associated with a higher minimum authentication strength than an authentication strength associated with the initial graphical image, wherein the subset is identified as including those graphical images of the plurality of graphical images that are associated with the higher minimum authentication strength;
   automatically selecting a graphical image, from the plurality of graphical images, for presentation to the user based on activation of the processing device, wherein the selecting selects the graphical image from the identified subset of graphical images;
   presenting, using a graphical display of the processing device, the selected graphical image to the user; and
   determining, based on input received from the user by way of an input device of the processing device, and based further on the authenticator associated with the selected graphical image, whether the user is authenticated to use the processing device.

17. The computer system of claim 16, wherein the identifying the subset is based on a current usage context of the processing device.

* * * * *